Oct. 20, 1925.
W. F. BIELICKE
1,558,073
OBJECTIVE LENS SYSTEM
Filed Jan. 18, 1922
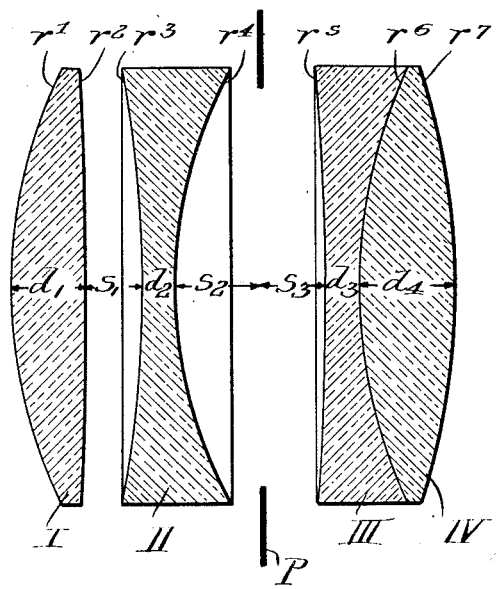
INVENTOR.
William F. Bielicke
BY Frederick F. Church
his ATTORNEY Patented Oct. 20, 1925.

1,558,073

UNITED STATES PATENT OFFICE.

WILLIAM F. BIELICKE, OF ROCHESTER, NEW YORK, ASSIGNOR TO BAUSCH & LOMB OPTICAL COMPANY, OF ROCHESTER, NEW YORK, A CORPORATION OF NEW YORK.

OBJECTIVE-LENS SYSTEM.

Application filed January 18, 1922. Serial No. 530,160.

*To all whom it may concern:*

Be it known that I, WILLIAM F. BIELICKE, a citizen of the United States, and resident of Rochester, in the county of Monroe and State of New York, have invented certain new and useful Improvements in Objective-Lens Systems; and I do hereby declare the following to be a full, clear, and exact description of the same, reference being had to the accompanying drawings, forming a part of this specification, and to the reference numerals marked thereon.

This invention relates to the lenses and more particularly to objective lens systems of large relative aperture, such as are used, for example, for photographic, microscopic, projection and similar purposes, the chief object of the invention being to provide a lens system of this character corrected for spherical and chromatic aberration, astigmatism, distortion and coma, with provision for correcting the coma for all angles of the useful field to a degree heretofore not obtained in any lens system composed of not more than four lenses.

The present invention is embodied, as shown in the drawings, in a system consisting of four lenses, namely a collective lens I and a dispersive lens II separated by an air space SI and placed in front of the diaphragm P, and a dispersive lens III and a collective lens IV cemented together and placed behind the diaphragm.

It has been a common aim in the art of making lenses to introduce into a lens system a collective doublet the elements of which have refractive indices differing as largely as practicable for the purpose of correcting the astigmatism over a large field. While such large difference in indices is of material assistance for correcting astigmatism in a system the components of which are all cemented together, it is, however, of little importance in lens systems the components of which are separated by air spaces.

Accordingly in carrying out the present invention the cemented doublet behind the diaphragm of the present system comprises lenses having refractive indices differing substantially from each other, as more particularly specified hereafter, while the lenses in front of the diaphragm which are separated by an air space may have indices the difference between which is unimportant for present purposes.

As indicated therefore it is the cemented doublet comprising lenses III and IV, which is utilized for the correction of coma effects and it has been found that while the coma in the case of a parallel beam of light intersecting the optical axis of a system such as the present one at relatively small angles can be readily corrected, where the beam intersects the axis at relatively greater angles, however, there is a tendency to focus the light in front of the focal plane if the difference in the refractive indices is larger than 0.055, and to focus the light behind the focal plane if the difference in indices is smaller than 0.055. If the difference in indices lies between 0.050 and 0.060 the amount of coma will not be large enough to interfere with the definition to a great extent. Thus there is a permissible range of tolerance of plus or minus 0.005.

The collective lens in the back or cemented doublet is preferably made of baryta crown glass having a high index of refraction of at least 1.615 because of the high degree of astigmatic correction obtained with such glass, while the refractive indices of the two front lenses may vary considerably. The use of this high refractive index glass in combination with the stated differences of refractive index between the lenses III and IV of the back doublet, has been found especially advantageous if the ratio of the power of the front doublet to the power of the back doublet is between 0.10 and 0.35 as in the specific example, the data of which is given below where this ratio is 0.16. There is also the further advantage of comparatively flat curves resulting from such combination and arrangement.

The data for making a lens system according to the present invention, as shown in the drawing, in the case of an objective of 188 mm. focal length having an aperture of $f:4.5$ mm., is as follows:

| Lens. | Curvature. | Thickness and air spaces. | $n_D$. | $n_{G1}$. | V. |
|---|---|---|---|---|---|
| I | $r_1 = + 49.01$<br>$r_2 = -478.70$ | $d_1 = 7.8$<br>$s_1 = 5.4$ | 1.6066 | 1.6226 | 56.5 |
| II | $r_3 = -114.30$<br>$r_4 = + 44.50$ | $d_2 = 2.3$<br>$s_2 = 8.7$<br>$s_3 = 6.2$ | 1.5602 | 1.5763 | 45.3 |
| III | $r_5 = -271.90$<br>$r_6 = + 47.11$ | $d_3 = 2.3$ | 1.5602 | 1.5763 | 45.3 |
| IV | $r_6 = + 47.11$<br>$r_7 = - 74.50$ | $d_4 = 9.7$ | 1.6165 | 1.6309 | 55.0 |

The characters $r_1$ to $r_7$ inclusive indicate the curvatures of the lenses as shown in the drawing from left to right respectively: thus the curvatures of the two surfaces of the lens I are indicated by $r_1$ and $r_2$; those of lens II by $r_3$ and $r_4$; those of lens III by $r_5$ and $r_6$, and those of lens IV by $r_6$ and $r_7$. The light is presumed to be incident from left to right, and all errors that are convex toward the incident light are positive and those that are concave toward the incident light are negative.

The characters $d$ and $s$ with the subnumerals indicate the axial dimensions of the glass thicknesses and air spaces. Thus, $d_1$ is the distance between the points of intersection with the optical axis of curvatures $r_1$ and $r_2$; $d_2$, of curvatures $r_3$ and $r_4$; $d_3$ of curvatures $r_5$ and $r_6$, and $d_4$, of curvatures $r_6$ and $r_7$. $s_1$ indicates the distance from the rear vertex of lens I to the front vertex of lens II; $s_2$ the distance from the rear vertex of lens II to the diaphragm plane; $s_3$ the distance from the diaphragm plane to the front vertex of the lens III.

The characters $n_D$ and $n_{G1}$ respectively denote the refractive indices for the D line and for the G' line of the spectrum and the glasses of which the lenses I, II, III and IV are made.

The relative dispersion of the glass of which each lens is made is denoted by V and is generally expressed by the formula:

$$V = \frac{n_D - 1}{n_F - n_C},$$

in which $n_D$, $n_F$ and $n_C$ represent the refractive indices of the lens glasses for the D, F and C lines of the spectrum.

Utilization of the principles of the present invention affords a lens system in which the coma effects are corrected to a high degree for all angles of the useful field.

I claim as my invention:

An objective lens system for photographic, microscopic, projection and similar purposes, consisting of four lenses, a collective and a dispersive lens separated by an air space situated on one side of the diaphragm and a dispersive and a collective lens cemented together and situated on the other side of the diaphragm, the cemented collective lens being made of glass having a refractive index of not less than 1.61 and the refractive index of the dispersive lens cemented to it being smaller than the refractive index of the collective lens by at least 0.05 but not more than 0.06, the ratio of the power of the lenses composing the front doublet to the power of the lenses composing the back doublet being between 0.10 and 0.35.

WILLIAM F. BIELICKE.